(12) United States Patent
Park

(10) Patent No.: US 8,817,210 B2
(45) Date of Patent: Aug. 26, 2014

(54) FLAT PANEL DISPLAY

(75) Inventor: Jung-Mok Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 13/185,104

(22) Filed: Jul. 18, 2011

(65) Prior Publication Data

US 2012/0147299 A1 Jun. 14, 2012

(30) Foreign Application Priority Data

Dec. 14, 2010 (KR) ........................ 10-2010-0127792

(51) Int. Cl.
*G02F 1/1333* (2006.01)
(52) U.S. Cl.
USPC .............................. 349/122; 349/117; 349/96
(58) Field of Classification Search
USPC ..................................... 349/117, 196, 96, 122
See application file for complete search history.

(56) References Cited

U.S. PATENT DOCUMENTS

| 2007/0008471 | A1* | 1/2007 | Wang et al. | 349/117 |
| 2010/0253891 | A1* | 10/2010 | Fujioka et al. | 349/113 |
| 2010/0289779 | A1* | 11/2010 | Routley et al. | 345/205 |

FOREIGN PATENT DOCUMENTS

| JP | 2008-262326 | 10/2008 |
| KR | 10-2008-0054573 A | 6/2008 |
| KR | 10-2009-0090310 A | 8/2009 |
| KR | 10-2009-0132501 A | 12/2009 |

* cited by examiner

*Primary Examiner* — Bumsuk Won
*Assistant Examiner* — Kendrick Hsu
(74) *Attorney, Agent, or Firm* — Christie, Parker & Hale, LLP

(57) ABSTRACT

There is provided a flat panel display (FPD). The FPD includes a display panel, a substrate on the display panel, and an anti-reflection polarizer. The anti-reflection polarizer is on the substrate to absorb light reflected from a surface of the substrate or a surface of the display panel. The anti-reflection polarizer includes a top polarizing film for linearly polarizing the light, a top phase difference film for circularly polarizing light that passes through the top polarizing film, a first supporting film between the top polarizing film and the phase difference film to support the top phase difference film, and a second supporting film that faces the first supporting film with the top phase difference film interposed therebetween to support the top phase difference film.

13 Claims, 6 Drawing Sheets

FLAT PANEL DISPLAY

CROSS-REFERENCE TO RELATED APPLICATION

This application claims priority to and the benefit of Korean Patent Application No. 10-2010-0127792, filed on Dec. 14, 2010, in the Korean Intellectual Property Office, the entire content of which is incorporated herein by reference.

BACKGROUND

1. Field

Aspects of embodiments according to the present invention relate to a flat panel display (FPD), and more particularly, to an FPD with improved display quality.

2. Description of the Related Art

A flat panel display (FPD) may be made small, thin, and light and may be driven with low power consumption. Types of FPDs include a liquid crystal display (LCD) that may typically be applied in a large display device such as a monitor or a TV, and an organic light emitting display that may typically be applied in a portable display device.

When the FPD is applied in a portable display device, the FPD may include a window substrate that covers a display panel and may further include a touch screen panel for detecting the point touched by a user to convert the point into an electric signal. However, when the window substrate or the touch screen panel is provided on the display panel, external light incident from the outside is reflected to the window substrate or the touch screen panel so that reflected light may be generated. As a result, the user recognizes the reflected light that does not have image information so that the display quality of the FPD may deteriorate.

SUMMARY

Accordingly, embodiments of the present invention are directed toward a flat panel display (FPD) whose display quality is improved.

According town embodiment of the present invention, there is provided a display panel for displaying an image, a substrate positioned on the display panel, and an anti-reflection polarizer.

The anti-reflection polarizer is on the substrate to absorb light reflected from a surface of the substrate or a surface of the display panel.

The anti-reflection polarizer includes a top polarizing film for linearly polarizing light, a top phase difference film for circularly polarizing light that passes through the top polarizing film, a first supporting film between the top polarizing film and the phase difference film to support the top phase difference film, and a second supporting film that faces the first supporting film with the top phase difference film interposed therebetween to support the top phase difference film.

According to an embodiment of the present invention, the substrate may be a window substrate that covers the display panel.

In addition, according to another embodiment of the present invention, the display panel may include a liquid crystal panel.

According to still another embodiment of the present invention, the display panel may include an organic light emitting display panel.

According to the embodiment of the present invention, the FPD includes the anti-reflection polarizer to prevent the reflected light that does not have image information from being recognized by the user and to improve the display quality of the FPD. The phase difference film is interposed between the two supporting films in the anti-reflection polarizer so that the phase difference film may be supported by the two supporting films. Therefore, the phase difference film is not exposed to the outside to prevent a groove from being generated on the surface of the phase difference film. In addition, it is possible to prevent vapors from being generated between the phase difference film and the adhesive layer while the phase difference film is directly attached to an adhesive layer and to prevent the outer appearance of the FPD from being defective.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
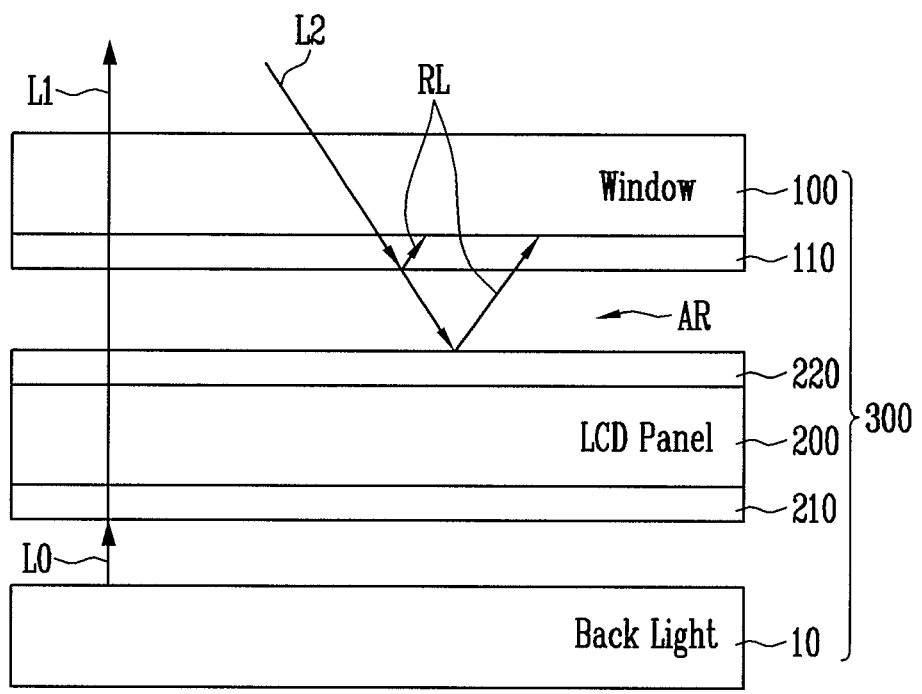
FIG. 1 is a cross-sectional view illustrating a flat panel display (FPD) according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" or "coupled to" another element, it can be directly connected to the element or be indirectly connected to the element with one or more intervening elements interposed therebetween. Hereinafter, like reference numerals refer to like elements.

Hereinafter, the embodiments of the present invention will be described in detail with reference to the accompanying drawings. The objects, characteristics, and effects of the present invention will be easily understood through the embodiments related to the attached drawings. The present invention is not limited to the embodiments described hereinafter, but various modifications may exist. The following embodiments are provided to clarify the spirit disclosed by the present invention and to fully transmit the spirit of the present invention to those skilled in the art. Therefore, the claims of the present invention should not be construed as being limited to the following embodiments. On the other hand, the drawings disclosed together with the following embodiments may be simplified or exaggerated for clarity and the same reference numerals denote the same elements.

Figure 2:
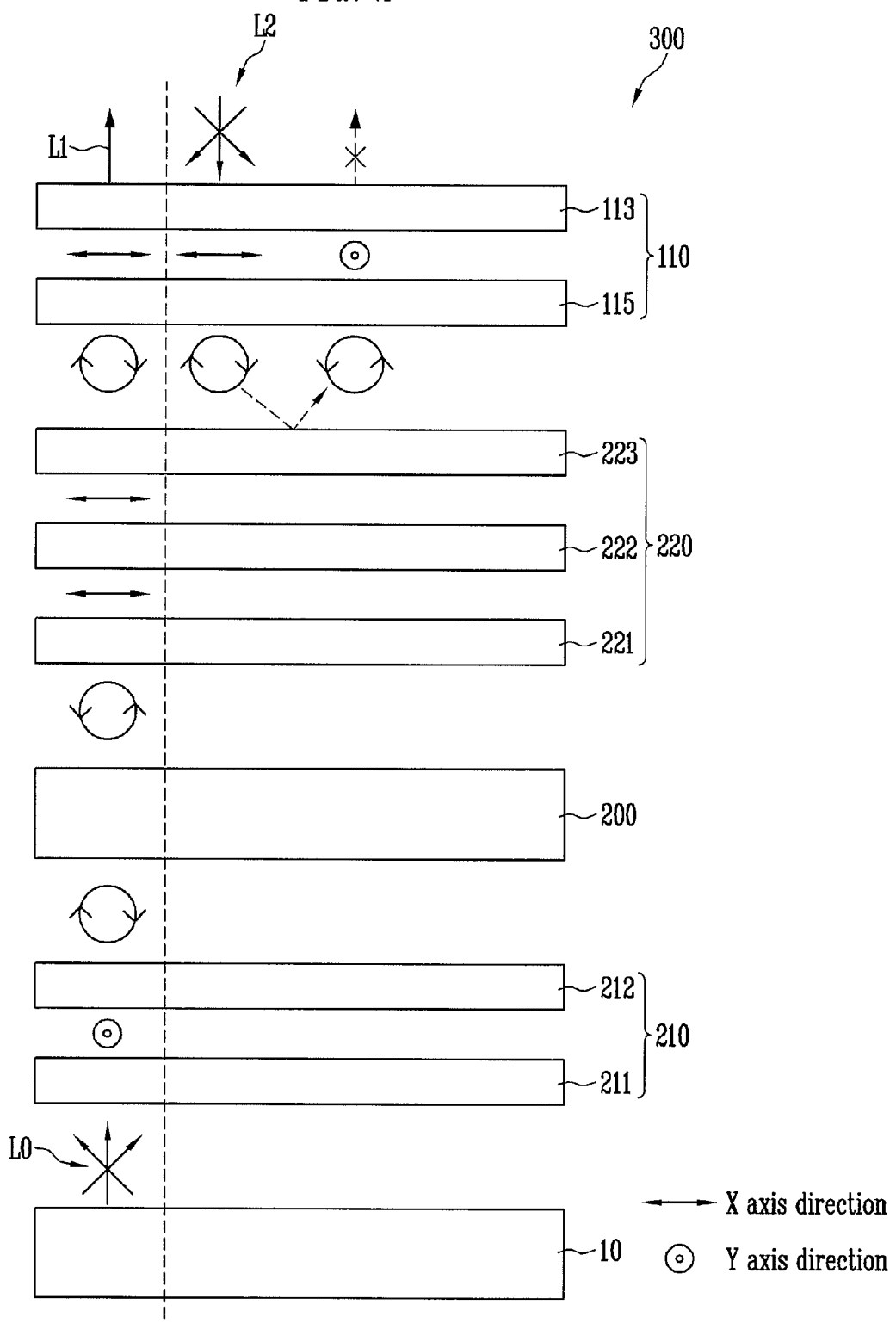
FIG. 2 is a view illustrating a principle of displaying an image and a principle of absorbing external light using an anti-reflection polarizer of the FPD of FIG. 1.

FIG. 1 is a cross-sectional view illustrating a flat panel display (FPD) according to an embodiment of the present invention. FIG. 2 is a view illustrating a principle of displaying an image and a principle of absorbing external light using the anti-reflection polarizer of the FPD of FIG. 1.

Referring to FIGS. 1 and 2, the FPD 300 includes a back light 10, a display panel 200, a first polarizer 210, a second polarizer 220, a window substrate 100, and an anti-reflection polarizer 110. In the embodiment of the present invention illustrated in FIGS. 1 and 2, the FPD 300 may be a liquid crystal display (LCD) and the display panel 200 may be an LCD panel.

The back light 10 positioned below the display panel 200 generates source light L0 and directs the source light L0 to the display panel 200.

The display panel 200 may include two substrates that face each other and a liquid crystal layer interposed between the two substrates. The display panel 200 receives the source light L0 from the back light 10 to output display light L1. The display light L1 has image information. In more detail, the display panel 200 controls the amount of the source light L0 that passes through the display panel 200 by using the liquid crystal layer to output the display light L1 to the outside.

The first polarizer 210 is attached to the rear surface of the display panel 200, and the second polarizer 220 is attached to the front surface of the display panel 200.

Referring to FIG. 2, the first polarizer 210 includes a first polarizing film 211 and a first phase difference film 212 and the first polarizing film 211 and the first phase difference film 212 are sequentially arranged on the back light 10. In addition, the second polarizer 220 includes a second phase difference film 221, a second polarizing film 222, and a third phase difference film 223. The second phase difference film 221, the second polarizing film 222, and the third phase difference film 223 are sequentially laminated on the display panel 200.

The first polarizing film 211 and the second polarizing film 222 include polyvinyl alcohol (PVA) and have transmission axes in one direction. Therefore, the first and second polarizing films 211 and 222 transmit only the light that vibrates in a direction parallel with their transmission axes so that the light that passes through the first and second polarizing films 211 and 222 is linearly polarized.

In addition, the first phase difference film 212, the second phase difference film 221, and the third phase difference film 223 may be quarter wave plates (QWP). The first to third phase difference films 212, 221, and 223 have polarizing axes or slow axes to delay the phase of light that vibrates along the polarizing axes or the slow axes. Therefore, the first to third phase difference films 212, 221, and 223 may circularly polarize the linearly polarized light or may linearly polarize the circularly polarized light.

On the other hand, the window substrate 100 is provided on the display panel 200 where the first and second polarizers 210 and 220 are attached, and the window substrate 100 is provided to cover the display panel 200. The window substrate 100 may be formed of a transparent material such as glass or plastic.

The anti-reflection polarizer 110 is attached to the rear surface of the window substrate 100 to face the display panel 200 with an air layer AR interposed therebetween. The anti-reflection polarizer 110 absorbs reflected light RL reflected from the surface of the anti-reflection polarizer 110 or the surface of the second polarizer 220 after external light L2 from the outside sequentially passes through the window substrate 100 and the anti-reflection polarizer 110. Therefore, the reflected light RL that does not have image information unlike the display light L1 is not recognized by the user to prevent the display quality of the FPD 300 from deteriorating, which will be described in more detail with reference to FIG. 2.

Referring to FIG. 2, the external light L2 that vibrates in all directions from the outside passes through a top polarizing film 113. When the top polarizing film 113 has a transmission axis parallel with an X axis direction (⇆), the light that passes through the top polarizing film 113 is converted into linearly polarized light that vibrates in the X axis direction (⇆). Then, the light linearly polarized by the top polarizing film 113 passes through a top phase difference film 115. The top phase difference film 115 may be a QWP. When the polarizing axis or the slow axis of the top phase difference film 115 is set as +40 degrees to +50 degrees based on the transmission axis of the top polarizing film 113, the light linearly polarized by the top polarizing film 113 passes through the top phase difference film 115 to be right-handed circularly polarized.

The light, which is right-handed circularly polarized by the top phase difference film 115, may be the reflected light (RL of FIG. 1) as illustrated in FIG. 1. In this case, the light, which is right-handed circularly polarized by the top phase difference film 115, has the phase changed 180 degrees to be left-handed circularly polarized. Then, the left-handed circularly polarized light passes through the top phase difference film 115 to be converted into linearly polarized light that vibrates in a Y axis direction (⊙) that is perpendicular to the X axis direction, and the light linearly polarized while passing through the top phase difference film 115 is absorbed by the top polarizing film 113 having a transmission axis parallel with the X axis direction (⇆).

Therefore, the reflected light (RL of FIG. 1) that does not have image information may be absorbed by the anti-reflection polarizer 110. Therefore, the user does not recognize the reflected light so that it is possible to prevent the display quality of the FPD 300 from deteriorating.

In some embodiments, unlike in the embodiment illustrated in FIG. 2, the polarizing axis or the slow axis of the top phase difference film 115 may be set as −40 degrees to −50 degrees based on the transmission axis of the top polarizing film 113.

In addition, a principle in which the FPD 300 outputs the display light L1 using the source light L0 generated by the back light 10 is as follows.

The source light L0 vibrates in all directions and is linearly polarized while passing through the first polarizing film 211. In the embodiment illustrated in FIG. 2, when the first polarizing film 211 has a first transmission axis that is parallel with the Y axis direction (⊙), the source light L0 that passes through the first polarizing film 211 is linearly polarized to vibrate in the Y axis direction (⊙). Then, the light linearly polarized by the first polarizing film 211 passes through the first phase difference film 212. According to one embodiment of the present invention, the first phase difference film 212 may be a QWP having a first polarizing axis. When the first polarizing axis is set as +45 degrees based on the first transmission axis, the light linearly polarized by the first polarizing film 211 is right-handed circularly polarized while passing the first phase difference film 212.

The light that is right-handed circularly polarized by the first phase difference film 212 passes through the display panel 200. According to one embodiment of the present invention, the liquid crystal layer of the display panel 200 may generate a phase difference by λ/2. In this case, the light that is right-handed circularly polarized by the first phase difference film 212 is left-handed circularly polarized by the liquid crystal layer.

The light that passes through the display panel 200 passes through the second phase difference film 221. When the second phase difference film 221 has a second polarizing axis that is orthogonal to the first polarizing axis, the light that is left-handed circularly polarized by the liquid crystal layer is linearly polarized to vibrate in the X axis direction (⇆). The light that passes through the second phase difference film 221 passes through the second polarizing film 222. The second polarizing film 222 has a second transmission axis parallel with the X axis direction (⇆) that is perpendicular to the Y axis direction (⊙). Therefore, the phase of the light that passes through the second phase difference film 221 does not change.

The light that passes through the second polarizing film 222 passes through the third phase difference film 223. The third phase difference film 223 has a third polarizing axis parallel with or orthogonal to the second polarizing axis. In one embodiment of the present invention, when the third polarizing axis and the second polarizing axis are parallel with each other, the light that passes through the third phase difference film 223 is right-handed circularly polarized. The light that passes through the third phase difference film 223 passes through the top phase difference film 115. When the polarizing axis of the top phase difference film 115 is orthogonal to the third polarizing axis, the light that is right-handed circularly polarized by the third phase difference film 223 is linearly polarized to vibrate in the X axis direction (⇆) by the top phase difference film 115.

Then, the light that is linearly polarized by the top phase difference film 115 passes through the top polarizing film 113. The top polarizing film 113 has a transmission axis parallel with the X axis direction (⇆). Therefore, the light that is linearly polarized by the top phase difference film 115 passes through the top polarizing film 113 without a change in the phase to be projected to the outside and to become the display light L1.

On the other hand, as described above, the window substrate 100 including the anti-reflection polarizer 110 is separated from the display panel 200 including the first and second polarizers 210 and 220 with the air layer AR interposed therebetween. That is, one surface of the anti-reflection polarizer 110 is exposed to the air layer AR. A film having a relatively small surface strength, among the plurality of films that constitute the anti-reflection polarizer 110, is exposed to the air layer AR so that a scratch may be generated on the surface of the film. In order to prevent the scratch from being generated, the structure of the anti-reflection polarizer 110 may be as illustrated in FIG. 3, which will be described in more detail with reference to FIG. 3.

Figure 3:
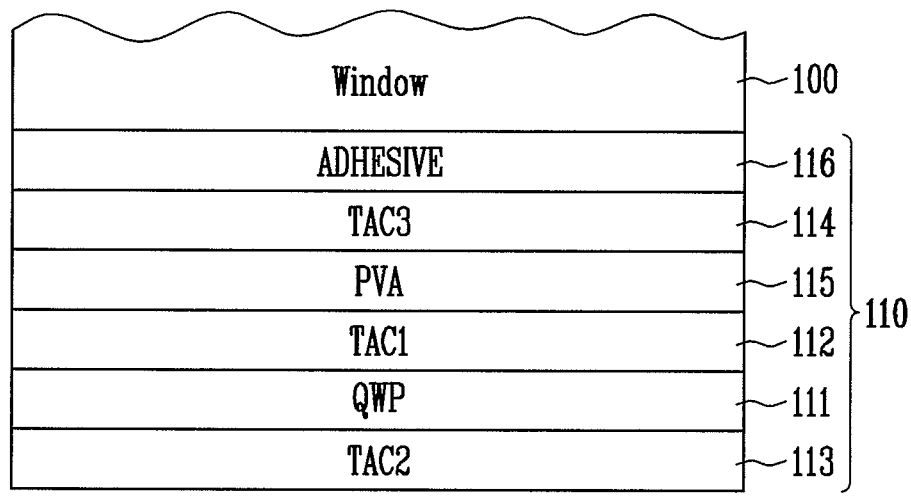
FIG. 3 is a cross-sectional view illustrating an enlargement of the anti-reflection polarizer of FIG. 1.

FIG. 3 is a cross-sectional view illustrating an enlargement of the anti-reflection polarizer of FIG. 1.

Referring to FIG. 3, the anti-reflection polarizer 110 includes a top phase difference film 111, a first supporting film 112, a second supporting film 113, a third supporting film 114, a top polarizing film 115, and an adhesive layer 116.

In the anti-reflection polarizer 110, the adhesive layer 116 is positioned at the uppermost part to be attached to the rear surface of the window substrate 100. Under the adhesive layer 116, the third supporting film 114, the top polarizing film 115, the first supporting film 112, the top phase difference film 111, and the second supporting film 113 are sequentially arranged. In the structure of the above-described anti-reflection polarizer 110, the top phase difference film 111 is interposed between the first supporting film 112 and the second supporting film 113, and the top polarizing film 115 is interposed between the first supporting film 112 and the third supporting film 114.

According to one embodiment of the present invention, the first to third supporting films 112, 113, and 114 are formed of triacetate cellulose (TAC) having higher durability and a non-optical characteristic. Therefore, the first supporting film 112 supports the top surface of the top phase difference film 111 and the second supporting film 113 supports the bottom surface of the top phase difference film 111.

In particular, the second supporting film 113 supports the bottom surface of the top phase difference film 111 and covers the top phase difference 111 so that the top phase difference film 111 is not exposed to the air layer AR. Therefore, it is possible to prevent the top phase difference film 111 from being exposed to the air layer AR so that it is possible to prevent the shape of the top phase difference film 111 from being deformed by an external environmental factor and to prevent a scratch from being generated on the surface of the top phase difference film 111 by external pressure.

In some embodiments, unlike in FIG. 3, the second supporting film 113 may be replaced by a functional film such as the anti-reflection film. In this case, the anti-reflection film is positioned at the lowermost part of the anti-reflection polarizer 110 to reduce the amount of the external light L1 reflected from the rear surface of the anti-reflection polarizer 110 and to increase the amount of the external light (L2 of FIG. 1) provided to the display panel (200 of FIG. 1) that may operate in a semi-transmission mode.

Figure 4A:
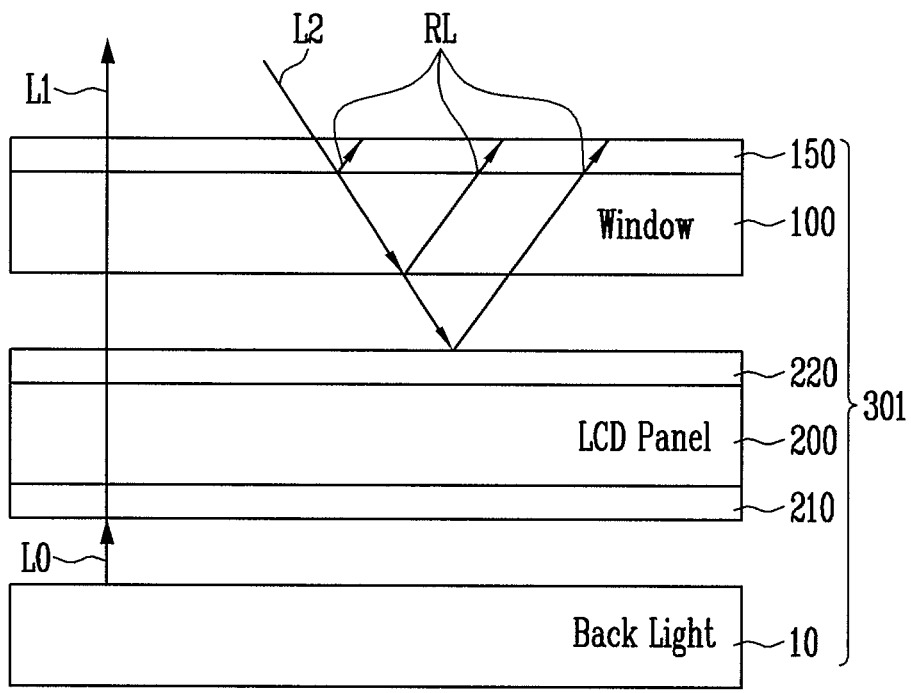
FIG. 4A is a cross-sectional view illustrating a flat panel display (FPD) according to another embodiment of the present invention.
Figure 4B:
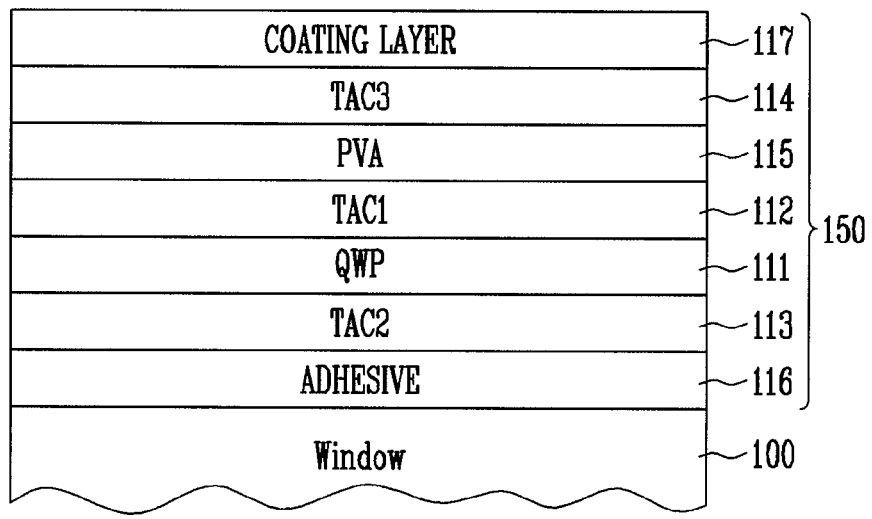
FIG. 4B is a cross-sectional view illustrating an enlargement of the anti-reflection polarizer of FIG. 4A.

FIG. 4A is a cross-sectional view illustrating a flat panel display (FPD) according to another embodiment of the present invention. FIG. 4B is a cross-sectional view illustrating an enlargement of an anti-reflection polarizer of FIG. 4A.

In one embodiment, an FPD 301 illustrated in FIG. 4A has substantially the same structure as the FPD (300 of FIG. 1) described with reference to FIGS. 1 to 3, excluding the structure of an anti-reflection polarizer 150. In the anti-reflection polarizer 150 and the anti-reflection polarizer (110 of FIGS. 1 to 3) illustrated in FIGS. 1 to 3, since the structures related to the polarizing film and the phase difference film are the same, the anti-reflection polarizer 150 and the anti-reflection polarizer (110 of FIGS. 1 to 3) illustrated in FIGS. 1 to 3 have the same optical function. Therefore, in describing FIGS. 4A and 4B, description of the optical function of the anti-reflection polarizer 150 is omitted. The elements described in FIGS. 1 to 3 are denoted by the same reference numerals in FIGS. 4A and 4B, and description of the same elements in FIGS. 4A and 4B will be omitted.

Referring to FIG. 4A, the FPD 301 includes the back light 10, the display panel 200, the first polarizer 210, the second polarizer 220, the window substrate 100, and the anti-reflection polarizer 150. In the embodiment illustrated in FIG. 4A, the FPD 301 may be a liquid crystal display (LCD) and the display panel 200 may be an LCD panel.

The anti-reflection polarizer 150 is attached to the front surface of the window substrate 100. As a result, the anti-reflection polarizer 150 may absorb the reflected light RL reflected from the surface of the window substrate 100 or the surface of the second polarizer 220 after the external light L2 passes through the anti-reflection polarizer 150. The detailed structure of the anti-reflection polarizer 150 will be described in more detail as follows.

Referring to FIG. 4B, the anti-reflection polarizer 150 includes the top phase difference film 111, the first supporting film 112, the second supporting film 113, the third supporting film 114, the top polarizing film 115, the adhesive layer 116, and a coating layer 117.

In the anti-reflection polarizer 150, the adhesive layer 116 is positioned at the lowermost part to be attached to the front surface of the window substrate 100. The second supporting film 113, the top phase difference film 111, the first supporting film 112, the top polarizing film 115, the third supporting film 114, and the coating layer 117 are sequentially laminated on the adhesive layer 116.

In the anti-reflection polarizer 150, the coating layer 117 is positioned at the uppermost part to be exposed to the outside. In one embodiment of the present invention, the coating layer 117 may include transparent resin to have a non-optical characteristic. The coating layer 117 prevents the surface of the anti-reflection polarizer 150 from being contaminated by foreign substances received from the outside.

In one embodiment, when the adhesive layer 116 is directly adhered to the top phase difference film 111 without the second supporting film 113, vapors may be generated at the interface between the adhesive layer 116 and the top phase difference film 111 due to an external environmental factor. The vapors may deteriorate a coupling force between the adhesive layer 116 and the top phase difference film 111. The vapors are recognizable from the outside so that the outer appearance of the FPD 301 may appear defective. However, like in the embodiment of FIG. 4B, when the second supporting film 113 is interposed between the adhesive layer 116 and the top phase difference film 111, the generation of the vapors may be reduced. The results of the tests that may support the above discussion are illustrated in TABLE 1.

TABLE 1

| Classification | Number of test samples | Number of defective products | Number of good products | Test condition | Note |
| --- | --- | --- | --- | --- | --- |
| First test | 10 | 0 | 10 | Expose samples at 85° C. for 72 hours. | In the second test, vapors having diameters of no less than 0.2 mm are generated in all the samples within 3 hours. |
| Second test | 10 | 10 | 0 | | |

Referring to TABLE 1, the first test illustrates a result of performing the reliability test on the FPD 301 according to the embodiment of the present invention illustrated in FIGS. 4A and 4B. In more detail, the FPD 301 is left in a chamber that is maintained at the temperature of 85° C. for 72 hours, and then it is tested whether vapors are generated at the interface between the adhesive layer 116 and the second supporting film 113 or the interface between the top phase difference film 111 and the second supporting film 113.

The second test illustrates a result of testing the reliability of an FPD according to a comparative example. The anti-reflection polarizer that the FPD according to the comparative example does not include the second supporting film 113 so that the top phase difference film 111 is directly attached to the adhesive layer 116. The conditions of the first test are the same as the conditions of the second test.

Referring to the result of the first test, vapors are not generated in the 10 test samples. However, referring to the result of the second test, after performing the test, vapors having diameters of no less than 0.2 mm are generated in all of the 10 test samples. That is, the results of the first and second tests show that when the second supporting film 113 is interposed between the top phase difference film 111 and the adhesive layer 116, it is possible to prevent the vapors from being generated.

Figure 5A:
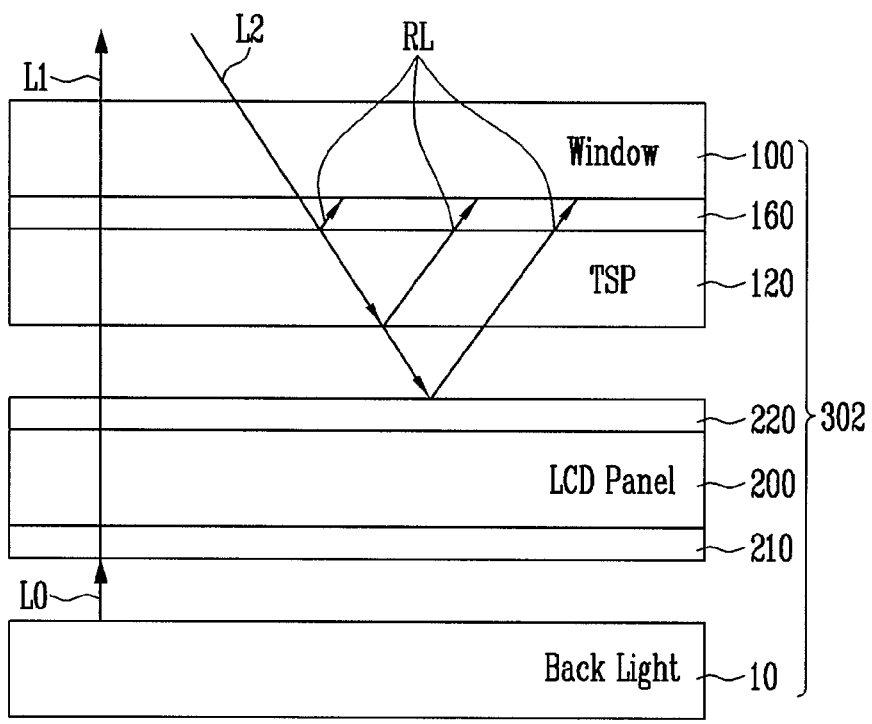
FIG. 5A is a cross-sectional view illustrating an FPD according to still another embodiment of the present invention.
Figure 5B:
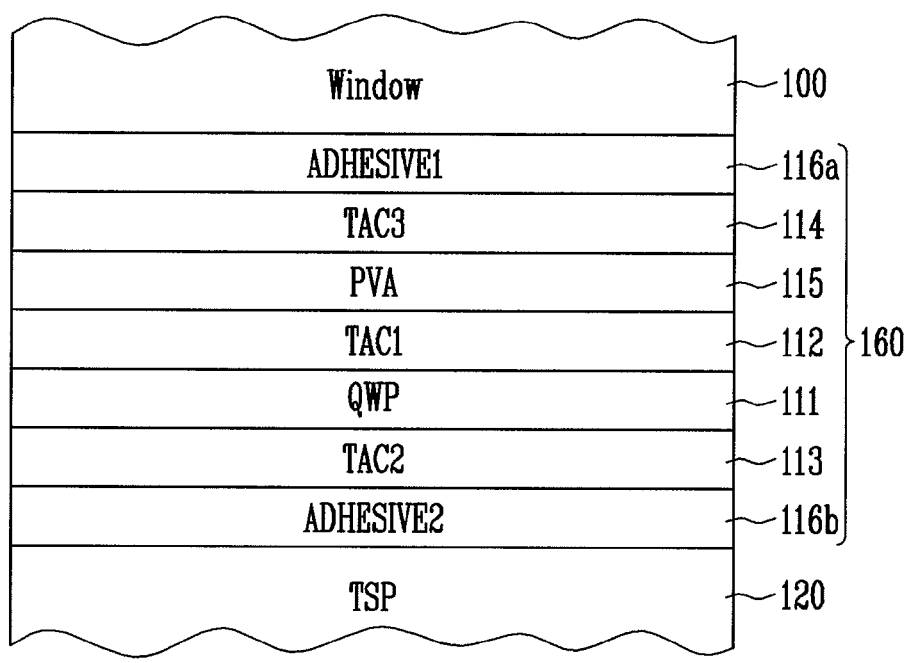
FIG. 5B is a cross-sectional view illustrating an enlargement of an anti-reflection polarizer of FIG. 5A.

FIG. 5A is a cross-sectional view illustrating an FPD according to still another embodiment of the present invention. FIG. 5B is a cross-sectional view illustrating an enlargement of the anti-reflection polarizer of FIG. 5A.

In one embodiment, when the structure of the FPD 302 illustrated in FIG. 5A is compared with the structure of the FPD (300 of FIG. 1) illustrated in FIG. 1, the FPD 302 further includes a touch screen panel 120. In addition, the FPD 302 includes an anti-reflection polarizer 160 having the same optical function as the anti-reflection polarizer (110 of FIG. 3) described with reference to FIGS. 1 to 3, but having a different structure. Therefore, in describing FIGS. 5A and 5B, excluding the touch screen panel 120 and the anti-reflection polarizer 160, the elements described with reference to FIGS. 1 to 3 are denoted by the same reference numerals and repeated description of the elements and the optical function of the anti-reflection polarizer 160 will be omitted.

Referring to FIG. 5A, the FPD 302 includes the back light 10, the display panel 200, the first polarizer 210, the second polarizer 220, the window substrate 100, the touch screen panel 120, and the anti-reflection polarizer 160. The touch screen panel 120 senses the touch of the user generated to correspond to the image displayed on the display panel 200 and converts the sensed touch into an electric signal. In the embodiment illustrated in FIG. 5A, the FPD 302 may be the LCD and the display panel 200 may be the LCD panel.

When the FPD 302 includes the touch screen panel 120, the anti-reflection polarizer 160 is positioned between the window substrate 100 and the touch screen panel 120. Therefore, the anti-reflection polarizer 160 may absorb the reflected light RL, which is generated by the external light L2 provided from the outside, being reflected from the surface of the touch screen panel 120 or the second polarizer 220. The detailed structure of the anti-reflection polarizer 160 will be described as follows.

Referring to FIG. 5B, the anti-reflection polarizer 160 includes the top phase difference film 111, the first supporting film 112, the second supporting film 113, the third supporting film 114, the top polarizing film 115, a first adhesive layer 116a, and a second adhesive layer 116b.

In the anti-reflection polarizer 160, the first adhesive layer 116a is positioned at the uppermost part to be attached to the rear surface of the window substrate 100, and the second adhesive layer 116b is positioned at the lowermost part to be attached to the front surface of the touch screen panel 120. In addition, the third supporting film 114, the top polarizing film 115, the first supporting film 112, the top phase difference film 111, the second supporting film 113, and the second adhesive layer 116b are sequentially laminated under the first adhesive layer 116a.

In one embodiment, when the second adhesive layer 116b is attached to the touch screen panel 120 and the second adhesive layer 116b is directly attached to the top phase difference film 111 without the second supporting film 113, vapors may be generated at the interface between the second adhesive layer 116b and the top phase difference film 111 due to an external environmental factor. However, like in the embodiment of FIG. 5B, when the second supporting film 113 is interposed between the second adhesive layer 116b and the second supporting film 113, it is possible to prevent the vapors from being generated so that it is possible to prevent the outer appearance of the FPD 302 from being defective due to the generation of the vapors.

In one embodiment, unlike in the embodiment illustrated in FIG. 5A, the display panel 200 may be integrated with the touch screen panel 120. In this case, the display panel 200 integrated with the touch screen panel 120 may be separated from the window substrate 100, to which the anti-reflection polarizer 160 is attached with an air layer interposed therebetween, and may be attached to one surface of the anti-reflection polarizer 160.

Figure 6:
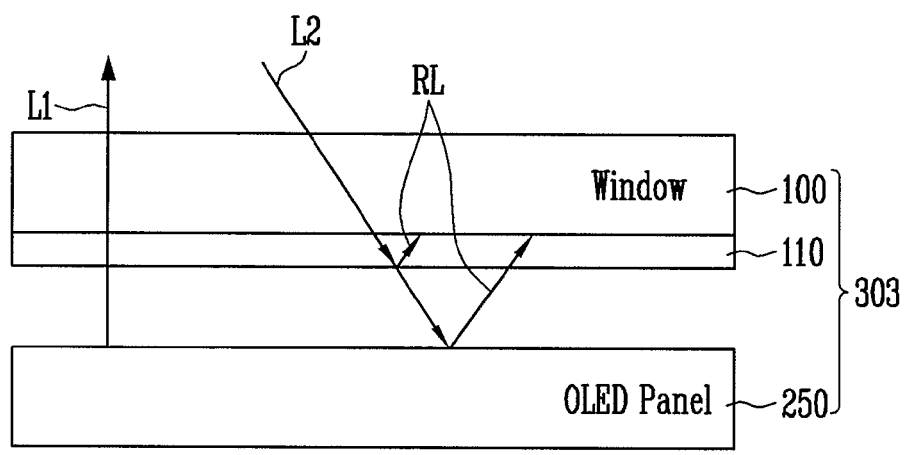
FIG. 6 is a cross-sectional view illustrating an FPD according to still another embodiment of the present invention.

FIG. 6 is a cross-sectional view illustrating an FPD according to still another embodiment of the present invention. In describing FIG. 6, the elements described with reference to FIGS. 1 to 3 are denoted by the same reference numerals and description of the elements will be omitted.

Referring to FIG. 6, an FPD 303 includes the window substrate 100, the anti-reflection polarizer 110, and a display panel 250.

According to the embodiment of the present invention illustrated in FIG. 6, the FPD 303 may be an organic light emitting display and the display panel 250 may be an organic light emitting display panel. The display panel 250 has pixel regions and pixels including organic light emitting diodes (OLED) that generate the display light L1, and the pixels are formed in the pixel regions. The display light L1 is projected to the outside so that the FPD 303 may display an image using the display light L1.

As illustrated in FIG. 6, when the external light L2 sequentially passes through the window substrate 100 and the anti-reflection polarizer 110, and is reflected from the surface of the anti-reflection polarizer 110 or the surface of the display panel 250 to generate the reflected light RL, the anti-reflection polarizer 110 may absorb the reflected light RL. Therefore, the reflected light RL that does not have image information unlike the display light L1 is not recognized by the user so that it is possible to prevent the display quality of the FPD 303 from deteriorating.

Figure 7:
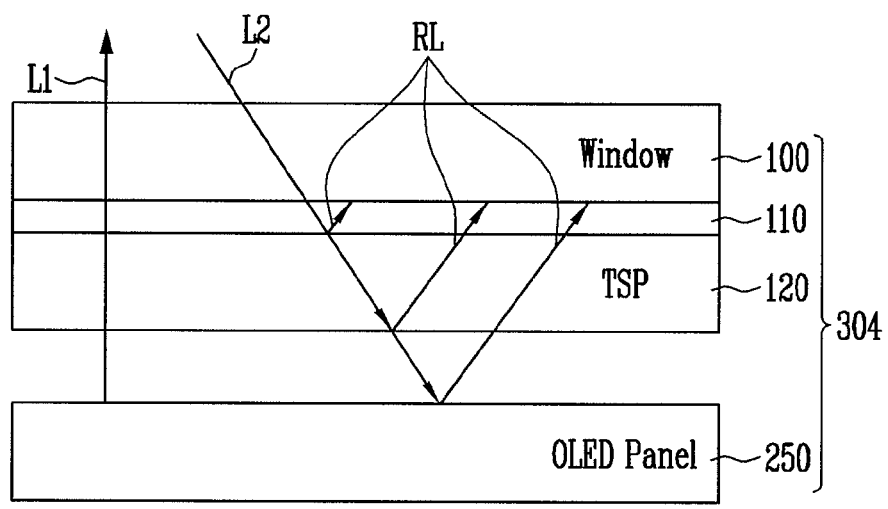
FIG. 7 is a cross-sectional view illustrating an FPD according to still another embodiment of the present invention.

FIG. 7 is a cross-sectional view illustrating an FPD according to still another embodiment of the present invention. In describing FIG. 7, the elements described in the above described embodiments of the present invention are denoted by the same reference numerals and description of the elements will be omitted.

Referring to FIG. 7, an FPD 304 includes the window substrate 100, the touch screen panel 120, the anti-reflection polarizer 110, and the display panel 250.

According to the embodiment of the present invention illustrated in FIG. 7, the FPD 304 may be an organic light emitting display and the display panel 250 may be an organic light emitting display panel. The display panel 250 has pixel regions and pixels including OLEDs that generate the display light L1. The pixels are formed in the pixel regions.

As illustrated in FIG. 7, when the external light L2 sequentially passes through the window substrate 100 and the anti-reflection polarizer 110, and is reflected from the surface of the touch screen panel 120 or the surface of the display panel 250 to generate the reflected light RL, the anti-reflection polarizer 110 may absorb the reflected light RL. Therefore, the reflected light RL that does not have image information unlike the display light L1 is not recognized by the user so that it is possible to prevent the display quality of the FPD 304 from deteriorating.

In one embodiment, unlike in the embodiment illustrated in FIG. 7, the display panel 250 may be integrated with the touch screen panel 120. In this case, the display panel 250 integrated with the touch screen panel 120 may be separated from the window substrate 100, to which the anti-reflection polarizer 110 is attached with the air layer interposed therebetween, and may be attached on one surface of the anti-reflection polarizer 110.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display (FPD) comprising:
a display panel for displaying an image;
a substrate on the display panel;
an anti-reflection polarizer on the substrate to absorb light reflected from a surface of the substrate or a surface of the display panel;
a first polarizer on a rear surface of the display panel that is a liquid crystal display (LCD) panel, the first polarizer including a first polarizing film having a first transmission axis and a first phase difference film having a first slow axis; and
a second polarizer on a front surface of the display panel and positioned between the anti-reflection polarizer and the first polarizer, the second polarizer including a second polarizing film having a second transmission axis that crosses the first transmission axis, a second phase difference film having a second slow axis that crosses the first slow axis, and a third phase difference film having a third slow axis,
wherein the second phase difference film, the second polarizing film, and the third phase difference film are sequentially arranged together with the second polarizing film between the second phase difference film and the third phase difference film, and are all positioned adjacent one another between the anti-reflection polarizer and the first polarizer, and
wherein the anti-reflection polarizer comprises:
a top polarizing film for linearly polarizing light;
a top phase difference film for circularly polarizing light that passes through the top polarizing film;
a first supporting film between the top polarizing film and the top phase difference film to support the top phase difference film; and
a second supporting film that faces the first supporting film with the top phase difference film interposed therebetween to support the top phase difference film, and
wherein the anti-reflection polarizer is between the substrate and the display panel, and is separated from the display panel with an air layer interposed therebetween so that the second supporting film is exposed to the air layer.

2. The FPD as claimed in claim 1, wherein the second supporting film comprises an anti-reflection film.

3. The FPD as claimed in claim 1, further comprising a touch screen panel coupled to the substrate with the anti-reflection polarizer interposed between the touch screen panel and the substrate,
wherein the anti-reflection polarizer further comprises an adhesive layer attached to one surface of the second supporting film to attach the second supporting film to the touch screen panel.

4. The FPD as claimed in claim 1, wherein the first slow axis and the second slow axis are orthogonal to each other.

5. The FPD as claimed in claim 1, wherein a slow axis of the top phase difference film is orthogonal to the third slow axis.

6. The FPD as claimed in claim 1, wherein the second slow axis and the third slow axis are orthogonal to each other or parallel with each other.

7. The FPD as claimed in claim 1, wherein the first transmission axis and the second transmission axis are orthogonal to each other, and
wherein a transmission axis of the top polarizing film is parallel with the second transmission axis.

8. The FPD as claimed in claim 1, wherein a slow axis of the top phase difference film and the first to third slow axes are set as +40 degrees to +50 degrees or −40 degrees to −50 degrees based on the first or second transmission axis.

9. The FPD as claimed in claim 1, further comprising a touch screen panel between the substrate and the display panel.

10. The FPD as claimed in claim 1, further comprising a touch screen panel integrated with the display panel.

11. The FPD as claimed in claim 1, further comprising a touch screen panel coupled to the substrate with the anti-reflection polarizer interposed between the touch screen panel and the substrate,
wherein the anti-reflection polarizer further comprises an adhesive layer on the second supporting film to attach the second supporting film to the touch screen panel.

12. The FPD as claimed in claim 1, further comprising a touch screen panel integrated with the display panel.

13. A flat panel display (FPD) comprising:
a display panel for displaying an image;
a substrate on the display panel;
an anti-reflection polarizer on the substrate to absorb light reflected from a surface of the substrate or a surface of the display panel,
a first polarizer on a rear surface of the display panel that is a liquid crystal display (LCD) panel, the first polarizer including a first polarizing film having a first transmission axis and a first phase difference film having a first slow axis; and
a second polarizer on a front surface of the display panel and positioned between the anti-reflection polarizer and the first polarizer, the second polarizer including a second polarizing film having a second transmission axis that crosses the first transmission axis, a second phase difference film having a second slow axis that crosses the first slow axis, and a third phase difference film having a third slow axis,
wherein the second phase difference film, the second polarizing film, and the third phase difference film are sequentially arranged together with the second polarizing film between the second phase difference film and the third phase difference film, and are all positioned adjacent one another between the anti-reflection polarizer and the first polarizer, and
wherein the anti-reflection polarizer comprises:
a top polarizing film for linearly polarizing light;
a top phase difference film for circularly polarizing light that passes through the top polarizing film;
a first supporting film between the top polarizing film and the top phase difference film to support the top phase difference film;
a second supporting film that faces the first supporting film with the top phase difference film interposed therebetween to support the top phase difference film; and
a third supporting film between the substrate and the top polarizing film, and
wherein the anti-reflection polarizer is between the substrate and the display panel, and is separated from the display panel with an air layer interposed therebetween so that the second supporting film is exposed to the air layer.

* * * * *